United States Patent [19]
Doll

[11] 4,001,078
[45] Jan. 4, 1977

[54] CONTROL APPARATUS
[75] Inventor: David W. Doll, San Diego, Calif.
[73] Assignee: General Atomic Company, San Diego, Calif.
[22] Filed: Mar. 7, 1975
[21] Appl. No.: 556,318
[52] U.S. Cl. .............................. 176/35; 176/36 R; 176/30
[51] Int. Cl.² ....................................... G21C 7/08
[58] Field of Search .................. 176/35, 36, 30, 22, 176/86

[56] References Cited
UNITED STATES PATENTS

| | | | |
|---|---|---|---|
| 2,898,281 | 8/1959 | Untermyer et al. | 176/36 R |
| 2,936,277 | 5/1960 | MacNeil et al. | 176/35 |
| 3,018,240 | 1/1962 | Bevilacqua et al. | 176/35 |
| 3,227,624 | 1/1966 | Lechevallier | 176/36 R |
| 3,232,842 | 2/1966 | Costes et al. | 176/36 R |
| 3,361,635 | 1/1968 | Long | 176/35 |
| 3,438,856 | 4/1966 | Ripley | 176/35 |
| 3,691,011 | 4/1972 | Kruger et al. | 176/36 R |

Primary Examiner—Samuel W. Engle
Assistant Examiner—S. A. Cangialosi
Attorney, Agent, or Firm—Fitch, Even, Tabin & Luedeka

[57] ABSTRACT

A nuclear reactor system is described in which flexible control rods are used to enable insertion of the control rods into guide holes in the core which are distributed over an area larger than the cross section of the control rod penetration in the reactor pressure vessel. Guide tubes extend from the penetration and fan out to the guide holes for guiding the control rods from the penetration to the guide holes.

6 Claims, 4 Drawing Figures

FIG. 2.
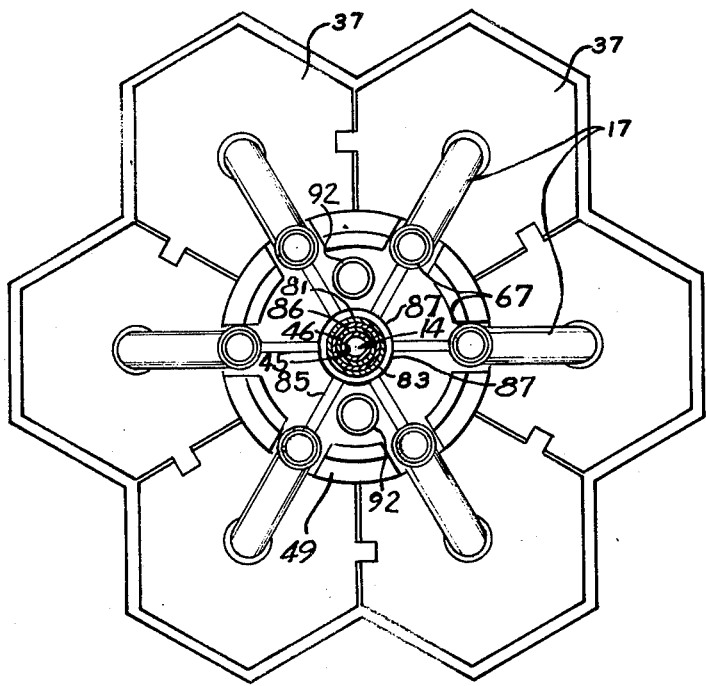
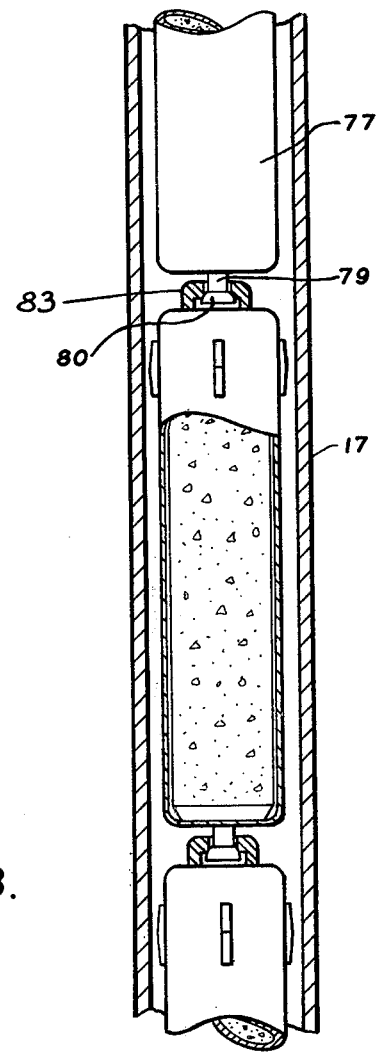
FIG. 3.

CONTROL APPARATUS

This invention relates generally to nuclear reactor systems and, more particularly, to improved control apparatus for a nuclear reactor system.

Typical nuclear reactor systems employ control rods comprised of neutron adsorber material which may be inserted into or withdrawn from the reactive core of the nuclear reactor. Where the reactor core is surrounded by a pressure vessel, such as is the case in a high temperature gas-cooled reactor, the control rods typically are operated by a mechanism extending through a penetration in the pressure vessel, and indeed the control rods themselves very often may be retracted into such penetration or penetrations.

In the design of a nuclear reactor system of the type described, it is desirable to minimize the number of penetrations in the pressure vessel which encloses the core to maximize the structural integrity of the pressure vessel. On the other hand, an uneven distribution of control rods throughout a region of the core or throughout the entire core can result in extreme variations in the neutron flux across a cross section of the core. This can cause undesirable variations in core temperature and in the rate at which fuel burn-up occurs in the core.

Many prior art nuclear reactor systems have therefore involved a compromise between the number of pressure vessel penetrations for the control rods and the uniformity of distribution of the control rods in the reactor core. Often, this comprise is not satisfactory, since it necessarily involves a reduction in both structural integrity of the pressure vessel and in the evenness of distribution of neutron flux in the core.

It is an object of the present invention to provide improved control apparatus for a nuclear reactor system.

It is another object of the invention to provide control apparatus for a nuclear reactor system which allows a minimization in the number of reactor pressure vessel penetrations required without compromising the uniformity of neutron flux in the reactor core.

Another object of the invention is to provide improved control apparatus for a nuclear reactor system capable of utilizing a single reactor pressure vessel penetration for control rods for a region of the core wherein control rod guide holes in the core are distributed over an area larger than the cross section of the penetration.

Other objects of the invention will become apparent to those skilled in the art from the following description, taken in connection with the accompanying drawings wherein:

FIG. 2 is a sectional view taken along the line 2—2 of FIG. 1;

FIG. 3 is an enlarged cross sectional view, with parts broken out, of a control rod and guide tube of the reactor system of FIG. 1.

Figures 1, 4:
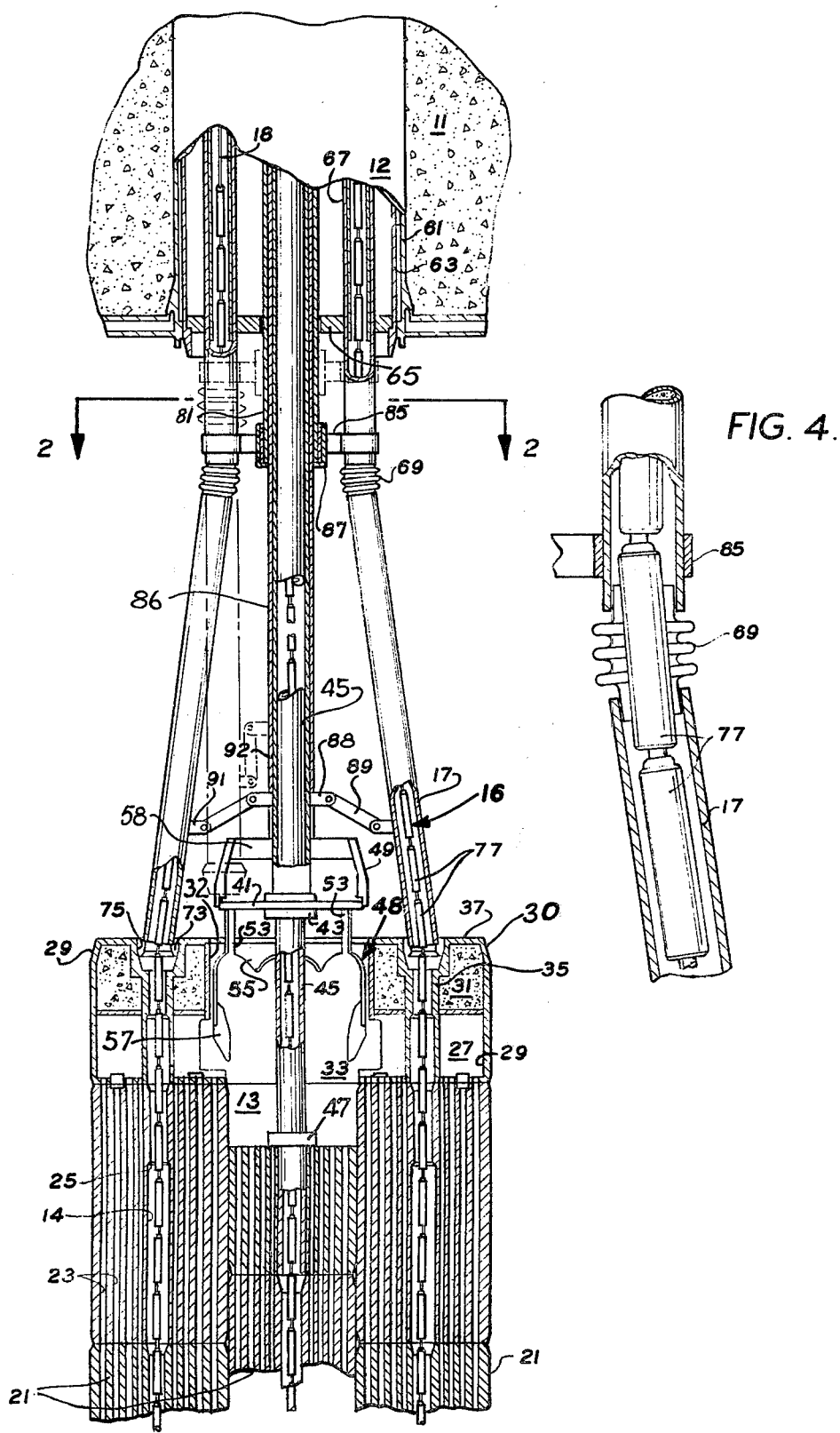
FIG. 1 is a full section side view of a portion of a nuclear reactor system incorporating the invention.
FIG. 4 is an enlarged view in cross section of a portion of a guide tube of the reactor system of FIG. 1.

Very generally, the nuclear reactor system incorporating the invention includes a pressure vessel 11 with at least one penetration 12 therein and a core region 13 enclosed by the pressure vessel and in which a plurality of control rod guide holes 14 are distributed over an area larger than the cross section of the penetration. Flexible control rods 16 are provided, one for each of the guide holes for insertion therein. A plurality of guide tubes 17 extend from the reactor vessel penetrations and fan out to respective ones of the guide holes for guiding the control rods from the penetration to the guide holes. Suitable means 18 are provided for moving the control rods through the guide tubes and into and out of the guide holes.

A particular form of nuclear reactor system in which the invention is illustrated and described herein employs a reactive core comprised of a plurality of core blocks. The core blocks are stacked in columns and may be comprised of fissile or fertile material, neutron moderating material, neutron reflecting material, or combinations of some or all of these. A reactor core of this general type is shown and described in U.S. Pat. No. 3,359,175 assigned to the United States of America as represented by the Atomic Energy Commission. Although shown and described herein with a nuclear reactor system of the described type, the invention is applicable to other types of systems wherein a plurality of control rod guide holes are distributed over an area of the core larger than the cross section of the penetration which serves them.

Referring more particularly to the drawings, one of the core regions 13 of which the reactor core is comprised is illustrated in connection with the apparatus of the invention. The reactor core may include a plurality of such core regions, each of which includes a group of seven fuel element columns of hexagonal cross section, each column being comprised of a plurality of core blocks. The core blocks are indicated at 21 and may be, as mentioned, fissile material, fertile material, reflector material, etc. The blocks may be held together with suitable dowel pins or interlocking configurations as described more particularly in the aforementioned U.S. patent. Each core region in the illustrated reactor system is comprised of seven columns of blocks, that is, a central column surrounded by six peripheral columns. The core blocks are provided with a plurality of aligned longitudinal passages therein indicated at 23 through which the reactor coolant passes.

Each of the core blocks is provided with a central hole 14 therein which is formed with a shoulder 25. A suitable grappling tool, not illustrated, may be inserted in the holes 14 and expanded to abut the shoulder 25 for lifting the blocks out of the reactor core during refueling procedures. The holes 14 in the peripheral columns are also used for accommodating the control rod, as will be explained.

Each of the core regions 13 is provided with a plenum 27 at the top thereof. The plenum 27 is formed by the outer walls 29 of a series of partially hexagonal elements 30 attached to the upper surface of the core region 13. The upper parts of the elements 30 contain material which forms an annular radiation shield 31 above the plenum 27. The plenum opens inwardly on the region 33 defined by it and the annular shield. The inner walls of the top parts of the elements 30 are arcuate and form a circular wall 32 bordering on the region 33. A tube 35 is provided at the top of each of the holes 14 in the peripheral columns to provide an extension of the hole through the plenum to the top plate 37 of the housing.

In the reactor system, the space above the reactor core and below the pressure vessel upper wall is pressurized by the flow of coolant gas. Regulation of the flow of pressurized gas from this region into the plenum 27 is controlled by a suitable valve positioned in and above the region 33 formed within the plenum 27 and shield 31 and above the central column of core blocks in each core region. Although the valve may be of any suitable configuration, the illustrated embodiment includes a plate 41 extending horizontally above the region 33 and spaced therefrom. The plate 41 is supported in a block 43 which is attached to a tube 45. The tube 45 rests on a bearing pad 47 which rests on the top surface of the central column of the core region aligned with the central hole 14 therein. The tube 45 extends upwardly through the penetration 12. A sleeve 46 is attached to a segmented frustoconical section 49 and extends upwardly coaxial with the tube 45. The frustoconical section 49 serves as a guide to facilitate removal of the apparatus through the penetration 12 in the reactor vessel 11.

With the valve element in its full downward or open position as shown, coolant is able to flow into the region 33 and the plenum 27 through the openings or windows 53 provided in the valve element 48. The lower edges 55 of the windows 53 are curved for fine flow adjustment. Guide plates 57 extend inwardly from the valve element 48 to assist in assembly. The vertical position of the valve element 48 with respect to the core column is adjusted by moving the sleeve 46 to vary the area of the windows 53 above the upper surface 37 of the elements 30 and thus regulate the flow of coolant into the region 33 and the plenum 27. The sleeve 46 connects the valve element 48 to a mechanism (not shown) exteriorly of the center cavity of the pressure vessel.

The pressure vessel penetration 12 is aligned with the central column in the core region 13. The penetration is provided with a penetration liner 61 and the control rod drive mechanism is mounted in a cylindrical housing 63 supported within the penetration 12. A lower plate 65 extends across the housing 63. The entire assembly of the valve 48, control rods 16, guides 17, housing 63, and connecting structure may be withdrawn in its entirety from the penetration and replaced with a suitable fuel element handling system during refueling operations. Control rod drive guide tubes 67 are supported within the housing 63 and extend axially within the housing, each of the tubes 67 corresponding to one of the peripheral columns of the core region 13. The control rods which move through the holes 14 in the peripheral columns may be withdrawn into the guide tubes 67 when it is desired to maximize the neutron flux in the reactor core. Preferably, at least some of the control rods in each column are individually controllable in their positions.

Because the holes 14 of the reactor core are arrayed about a circle having a diameter substantially larger than the diameter of the reactor vessel penetration, means are provided for enabling the control rods 16 to pass freely from the holes 14 into the guide tubes 67. To this end, the lower ends of the guide tubes 67 protrude into the space above the reactor core and are provided with a flexible bellows 69 on the lower projecting ends thereof. A more detailed view of the bellows may be seen in FIG. 4. An alternative design may utilize a hinge coupling if desired. Guide tubes 17 extend from each of the bellows 69 to the upper ends of the respective tubes 35 forming extensions of the holes 14. The tubes 17 fan outwardly to join the more widely spaced holes with the more closely grouped guide tubes 67. The lower ends of the guide tubes 17 are provided with bushings 73 which seal in suitable bushings 75 attached to the upper ends of the tubes 35.

In order to pass through the tubes 17, the control rods 16 are made flexible. In the illustrated embodiment, this is accomplished by manufacturing the control rods of a plurality of segments 77. Each of the segments in joined together, as shown in FIG. 3, by means of a rod extension 79 to the end of which is attached a semi-hemispherical ball 80. A ball housing 83 extends from the adjacent segment and captures the hemispherical ball 80 to provide the desired flexibility. In the case of a gas-cooled reactor, it is typically desirable to coat all rubbing and contacting surfaces with chromium carbide or the equivalent to prevent galling and self-welding due to the dryness of the coolant gas.

As previously mentioned, during refueling operations the control rod drive assembly and associated elements are removed from the penetration 12. In order to allow the apparatus to clear the penetration, the control rods are first withdrawn into the tubes 67, 17 and 45 within the housing 63 but clear of the bushings 75 and 47. The tubes 17 are then retracted upward and inward to fit within the penetration in the reactor vessel. This is accomplished by means of a longitudinal sleeve 81 coaxial with the sleeve 86 and the sleeve 46 which controls the valve for the reactor coolant. The sleeve 81 extends through a bearing sleeve 87 mounted on a spider-like support 85 extending from the lower ends of the tubes 67. A collar 88 fixed to the tube 86 near its lower end is attached to each of the tubes 17 by means of a link 89 which extends from a mounting bracket 91 on the tubes and is pivotally attached at each end.

To remove the guide tubes 17 for refueling, the sleeve 81 and the tube 86 are drawn upwardly together until the bushings 73 clear the plate 41. The tube 86 is then moved upwardly relative to the sleeve 81 and actuates the linkage 88, 89 and 91. The linkage operates to move the tubes 17 through slots in the guide 49 to the attitude shown in phantom, thus allowing the tubes to be withdrawn upwardly through the reactor pressure vessel penetration. A suitable mechanism, not shown, is provided outside the reactor vessel for accomplishing the foregoing movements. The reverse process is performed when the control rods arrangement is replaced after refueling.

In addition to the structural advantages accruing from the invention, a number of advantages occur also in the reactor physics. The use of a large number of small lowworth rods in a reactor core permits greater flexibility in rod programming schemes over the use of fewer and larger diameter rods. By selection of control rod insertion patterns, radial power distribution and shape can be selected as desired. Moreover, a more uniformly distributed rod pattern minimizes the perturbation of the power distribution which movement of the rods induces. Variations in power density as a result of aging of the various fuel elements at different rates is more readily controlled. Moreover, the axial power distribution can also be affected by judicious choice of the individual rod insertion pattern. Higher power can be tolerated for the same fuel temperature or a lower fuel temperature can be used to ensure a lower fuel failure rate with subsequent reduced circulating fission product activity as a result of a more even radial and axial distribution of neutron flux and power generation rate.

A more uniform temperature distribution also reduces radiation induced stress and distortion. When graphite is exposed to fast neutron bombardment, it experiences a densification which results in dimensional changes. The process is a function of the fast neutron dose and the temperature of the graphite during the exposure. When a temperature gradient exists in the graphite, differential strain produces internal stress and distortion. With reduced temperature and flux gradients, less differential strain and thereby less stress and overall distortion occurs.

A control rod may also be used in the central column. The central column rod may be used as a minimal reactivity "shim" rod so as to more evenly make changes in the power level of the reactor. The advantages to the axial power peaking are the same as for the other six control rods in the peripheral column. In addition, a hole may be provided in the central column to provide reserve shut-down capacity, or rather than a single hole, two reserve shut-down holes symmetrically located in the central column may be used. Tubes for conveying emergency shut-down poison are shown in FIG. 1 at 92.

Because of the large number of control rods of the present invention, sufficient shut-down capacity may be available so as to eliminate the need for the tubes 92. Under such circumstances, more advantages are available. The fuel blocks can be all of the same design, reducing inventory problems. Also, the absence of the holes for the tubes 92 provides more volume in the core for fuel and power generating capacity.

Other advantages result from the invention in terms of the greater flexibility of operation due to the large number of control rods and the ability to more closely regulate flux distribution and burn-up rates with respect to the various columns.

It may therefore be seen that the invention provides an improved nuclear reactor system and control apparatus therefor. Control rods may be inserted into holes in the reactor core which are spaced about an area which is larger than the cross section of the reactor pressure vessel penetration through which the control rods are operated. As a result, the integrity of the pressure vessel is maximized while at the same time ensuring a large distribution of control throughout the reactor core.

Various modifications of the invention in addition to those shown and described herein will become apparent to those skilled in the art from the foregoing description and accompanying drawings. Such modifications are intended to fall within the scope of the appended claims.

What is claimed is:

1. In a nuclear reactor system having a pressure vessel with at least one penetration therein, and a core region enclosed by the pressure vessel and in which a plurality of control rod guide holes are distributed over an area larger than the cross section of the penetration, control apparatus comprising, a plurality of flexible control rods, one for each of said guide holes for insertion therein, a plurality of originally parallel guide tubes extending from said penetration and fanning out to respective ones of said guide holes for guiding said control rods from said penetration to said guide holes, an intermediate portion of each of said guide tubes including flexible means to permit said fanning out, means for moving said control rods through said guide tubes and into and out of said guide holes, and means for withdrawing said guide tubes from said guide holes and displacing the more widely fanned out spaced ends of said guide tubes to bring said tubes into parallel alignment for withdrawal through said penetration.

2. Apparatus according to claim 1 wherein each of said control rods comprises a plurality of rigid segments joined by flexible joints.

3. A nuclear reactor system comprising a pressure vessel with at least one penetration therein, a reactor core enclosed by said pressure vessel and having a core region in which a plurality of control rod guide holes are distributed over an area larger than the cross section of said penetration, a plurality of flexible control rods, one for each of said guide holes for insertion therein, a plurality of guide tubes extending from said penetration and fanning out to respective ones of said guide holes for guiding said control rods from said penetration to said guide holes an intermediate portion of each of said guide tubes including a flexible means to permit said fanning out, means for moving said control rods through said guide tubes and into and out of said guide holes, and means for withdrawing said guide tubes from said guide holes and displacing the more widely fanned out spaced ends of said guide tubes to bring said tubes into parallel alignment for withdrawal through said penetration.

4. In a nuclear reactor system having a core region comprised of a central column of core blocks surrounded by a plurality of adjacent peripheral columns of core blocks, and wherein the core region is contained within a reactor vessel, control apparatus comprising, a plurality of control rods, one for each of said peripheral columns and adapted for insertion in holes extending longitudinally in said peripheral columns, said control rods being flexible, means for guiding said control rods between a withdrawn position axially spaced from said core region whereat said control rods are positioned sufficiently close to each other to pass through a penetration in the reactor vessel and an inserted condition whereas said control rods are inserted in the openings in said peripheral columns, positioned relatively farther from each other than in said withdrawn region, said guide means comprising a plurality of originally parallel guide tubes, one for each of said peripheral columns extending from the holes in said columns and converging in a region axially spaced from the core region and positioned directly adjacent the interior end of the reactor vessel penetration, an intermediate portion of each of said guide tubes including a flexible means to permit fanning out of said guide tube and means for withdrawing said guide tubes from said guide holes and displacing the more widely fanned out spaced ends of said guide tubes to bring said guide tubes into parallel alignment sufficiently close to each other so as to be withdrawable through the reactor vessel penetration.

5. Apparatus according to claim 4 wherein the number of said peripheral columns is six.

6. Apparatus according to claim 4 including a hole in said central column extending longitudinally thereof, a control rod for said central column, and means for guiding said central column control rod into and out of said central column hole.

* * * * *